(12) United States Patent
McCullough, IV et al.

(10) Patent No.: US 11,240,224 B2
(45) Date of Patent: Feb. 1, 2022

(54) SYSTEMS, METHODS AND APPARATUSES FOR IDENTITY ACCESS MANAGEMENT AND WEB SERVICES ACCESS

(71) Applicant: EDUTECHNOLOGIC, LLC, Columbus, OH (US)

(72) Inventors: Howell Dalton McCullough, IV, Dublin, OH (US); Brad Henry, Columbus, OH (US)

(73) Assignee: EduTechnologic, LLC, Columbus, OH (US)

( * ) Notice: Subject to any disclaimer, the term of this patent is extended or adjusted under 35 U.S.C. 154(b) by 284 days.

(21) Appl. No.: 16/595,207

(22) Filed: Oct. 7, 2019

(65) Prior Publication Data

US 2020/0112557 A1    Apr. 9, 2020

Related U.S. Application Data

(60) Provisional application No. 62/741,967, filed on Oct. 5, 2018.

(51) Int. Cl.
*H04L 29/06* (2006.01)
*H04L 9/06* (2006.01)

(52) U.S. Cl.
CPC ........ *H04L 63/0807* (2013.01); *H04L 9/0637* (2013.01); *H04L 63/083* (2013.01); *H04L 63/0823* (2013.01); *H04L 63/0861* (2013.01); *H04L 2463/082* (2013.01)

(58) Field of Classification Search
None
See application file for complete search history.

(56) References Cited

U.S. PATENT DOCUMENTS

| | | | | |
|---|---|---|---|---|
| 9,477,825 B1* | 10/2016 | Sinchak | ................ | H04L 63/107 |
| 10,212,547 B1* | 2/2019 | Santiago | ................ | H04W 12/04 |
| 2004/0260651 A1* | 12/2004 | Chan | ................ | G06F 21/41 |
| | | | | 705/50 |
| 2007/0162581 A1* | 7/2007 | Maes | ................ | H04L 61/15 |
| | | | | 709/223 |
| 2015/0074407 A1* | 3/2015 | Palmeri | ................ | H04L 63/0823 |
| | | | | 713/171 |
| 2017/0019396 A1* | 1/2017 | Bettenburg | ......... | H04L 63/0428 |
| 2017/0310613 A1* | 10/2017 | Lalji | ................ | H04L 67/20 |
| 2018/0239976 A1* | 8/2018 | Cornelius | ............... | G06F 1/163 |
| 2018/0302349 A1* | 10/2018 | Ban | ................ | H04L 51/04 |

* cited by examiner

*Primary Examiner* — Piotr Poltorak
(74) *Attorney, Agent, or Firm* — Benesch, Friedlander, Coplan & Aronoff LLP

(57) ABSTRACT

Systems, methods, and apparatus for identity access management for web services are disclosed. The method includes: creating on a user device, a session's access token and an identity token to be sent along with a request for accessing web services, wherein: the accessing of web services includes at least one of: retrieving and pushing information from an instance storage which is client specific and protected from unauthorized access by another instance storage; the session's access token indicates a location where the session's access token was created, an expiration time, and a hash identity for verifying a validity of the session's access token; the identity token identifies a user who sends the request; and authenticating the user on the user device according to the session's access token and the identity token to authorize the accessing of web services in a session.

14 Claims, 11 Drawing Sheets

SYSTEMS, METHODS AND APPARATUSES FOR IDENTITY ACCESS MANAGEMENT AND WEB SERVICES ACCESS

CROSS-REFERENCE TO RELATED APPLICATIONS/INCORPORATION BY REFERENCE

This disclosure claims priority to and the benefit from U.S. Provisional Patent Application Ser. No. 62/741,967 titled "Systems And Methods For Identity Access Management", filed on Oct. 5, 2018, which is herein incorporated by reference in its entirety.

TECHNICAL FIELD

This disclosure generally relates to systems, methods, devices, and/or products (referred to herein as "systems and methods") for identity and access management.

BACKGROUND

Learning trend steers towards self-guided instructions with minimal personal assistance. It remains an on-going challenge to design an intuitive and user-friendly tool to assist self-guided learning. As learning becomes more personalized, there is an increasing need to protect user's identity and to secure user's access to web services without being breached.

DESCRIPTION

Figure 1:
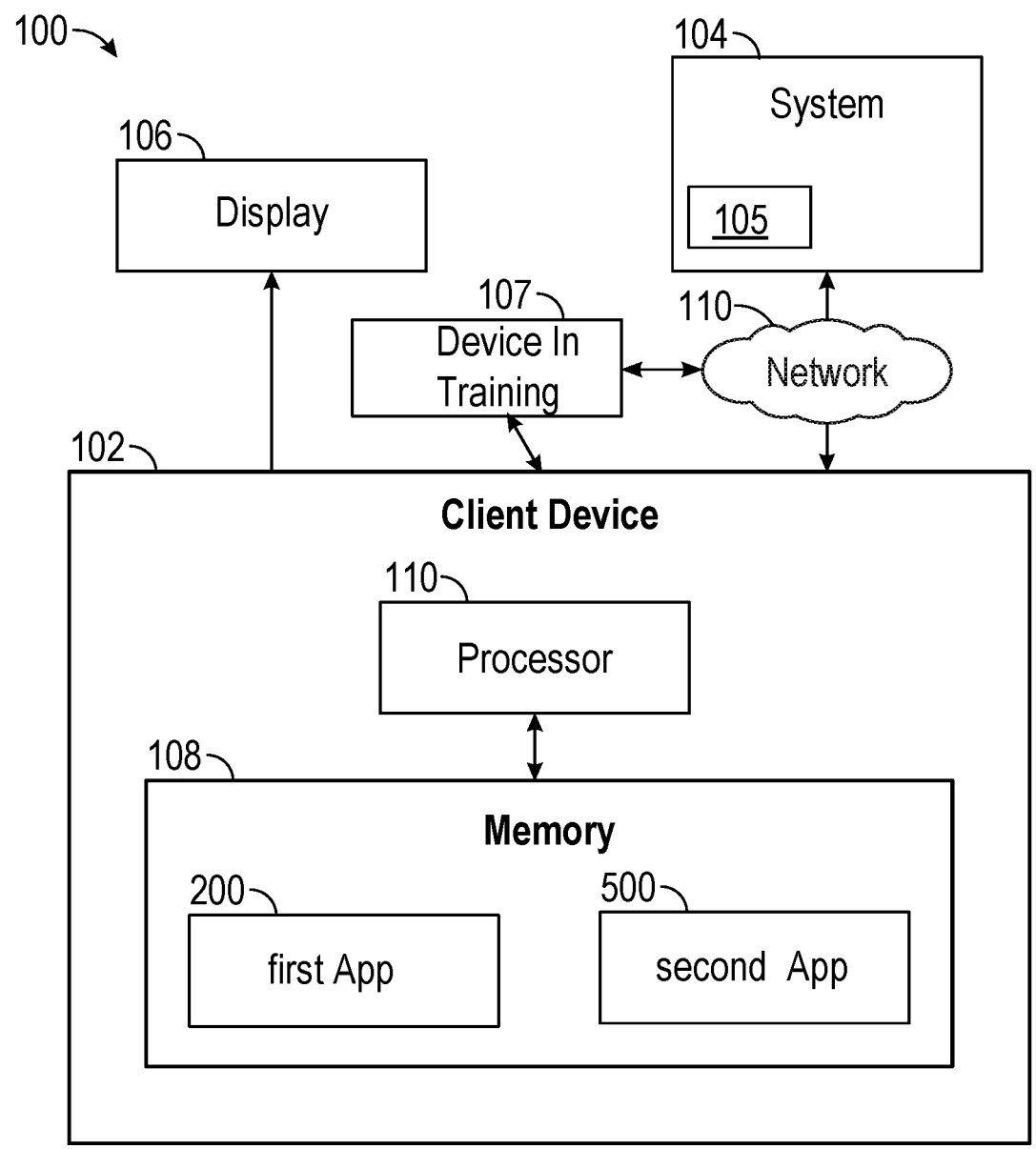
FIG. 1 illustrates an exemplary environment that includes a tool or a user device interacting with a system.

To facilitate understanding, various elements with out-of-sequence reference designations may be referred to corresponding drawings in the disclosure.

Identity management, also known as identity and access management in computer security, the security and business discipline that enables the right individuals to access the right resources at the right times and for the right reasons. Systems and methods described herein based on blockchain technology for validating, authenticating and/or revoking credentials (e.g., digital signatures). The systems and methods described herein may include multi-factor credentials, such as fingerprint and/or facial biometrics, as well as adding additional checks including, but not limited to, anomaly detection, device fingerprinting, geolocation checks and notification services to report or block suspicious attempts to access information and services (e.g., on a device or a computer). In some examples, the system and methods described herein may include blockchain nodes that can be configured to enable the registration of certificates on the blockchain and handle the revocation process through validation batches of transactions by combining them into blocks and maintaining consensus across a network. Machine to machine identity management is a new form of device authentication and identity management. As such, unlike certificates, unclonable functions are unique to a device. The systems and methods described herein link to blockchain and ledger technology and provide for device management through its life cycle, including multiple transfers of ownership with an immutable audit trail of device history.

In an aspect, a user device 102 (or system 102) implementing both a first local service application 200 and a second local service application 500 described herein may have particular advantages, including, but not limited to, a single sign-on (e.g., no passwords, pins, or passphrase authorization or requirement), and serverless (e.g., no signal point of failure as with central servers). Additional advantages of the systems and methods described herein can include simplified revocation management (e.g., there is no need to check the certificate validity when verifying signatures, eliminating the need for complicated Certificate Revocation Lists (CRLs)), long-term validity (e.g., there is no need for periodic re-timestamping of the signatures due to expiring keys, and as such, time and integrity of the signature can be proven mathematically without reliance on trusted parties or the security of keys), limited liability (e.g., hash signatures cannot be generated offline, removing the potential for unlimited liability in the case of private key theft), and/or quantum immunity (e.g., hash functions cannot be broken using quantum algorithms). In some examples, the system 102 may be configured to replace an existing RSA signature algorithm and be quantum-immune (e.g., it uses only hash function cryptography and not asymmetric key cryptography).

Another aspect of the disclosure described herein discloses a first local service application 200 in a user device 102 for integrating existing applications 105 within a process and/or a remote system 104, the first local service application 200 may function as a micro-service and extending the capability of the user device 102 with intelligent applications for wearable and mobile devices.

In some examples, the systems described herein may include (or correspond to) an Industrial Badger Application® (IBA), an integrated mixed reality content management system (IMR-CMS) (e.g., an IMR-CMS API), and/or an integrated mixed reality web client (e.g., an IMR-CMS client). The IBA may correspond to a tool that may be utilized within an existing environment by integrating existing applications within a process and/or system as a micro-service and extending their capability with intelligent applications for wearable and mobile devices. As such, the IBA may be integrated within the process and/or system to extend existing services by offloading the complexity of delivering information by providing technological solutions that simplify the experience for the user.

FIG. 1 illustrates an exemplary environment 100 that includes a tool or a user device 102. In some examples, the tool or user device 102 may include a processor 110 and a non-transitory computer storage medium, such as volatile memory (for example, but not limited to, random access memory), non-volatile memory 108 (for example, but not limited to, a hard disk drive, a solid-state drive, flash memory, or the like), or a combination thereof. The memory 108 may stores program codes of at least a first local service application 200 and a second local service application 500.

In an example, the first local service application 200 may interact with an existing application 105 in a remote system 104 to extend capabilities of the existing application 104 to augment learning of a device in training 107 (such as an onsite equipment or an instrument). In another example, the second local service application 500 may operate in conjunction with the first service application 200 to provide identity access management to access web services through the network 110.

In an example, the first local service application 200 may correspond to the industrial badger application (IBA) as described herein as an example. In some examples, the tool may be implemented on a user device 102. The user device 102 may include, but not limited to, a portable device such as a laptop, a tablet, a cellular device (e.g., smart phone client 404 in FIG. 3), a personal digital assistant (PDA), a server, a wearable device (e.g., RealWear HMT-1), a smart-watch, a non-portable device such as a desktop computer, a special purpose computer, and the like. In some examples, the tool or user device 102 may be configured to communicate with one or more other devices in training 107 and/or remote systems 104 over one of a wireless, a wired network 110, and a combination thereof. In an example, the tool or user device 102 may be configured to communicate with the remote system 104. The remote system 104, in some examples, may correspond to a system, as described herein. The tool or user device 102 may be configured to generate display information for rendering on a display 106.

Figure 2A:
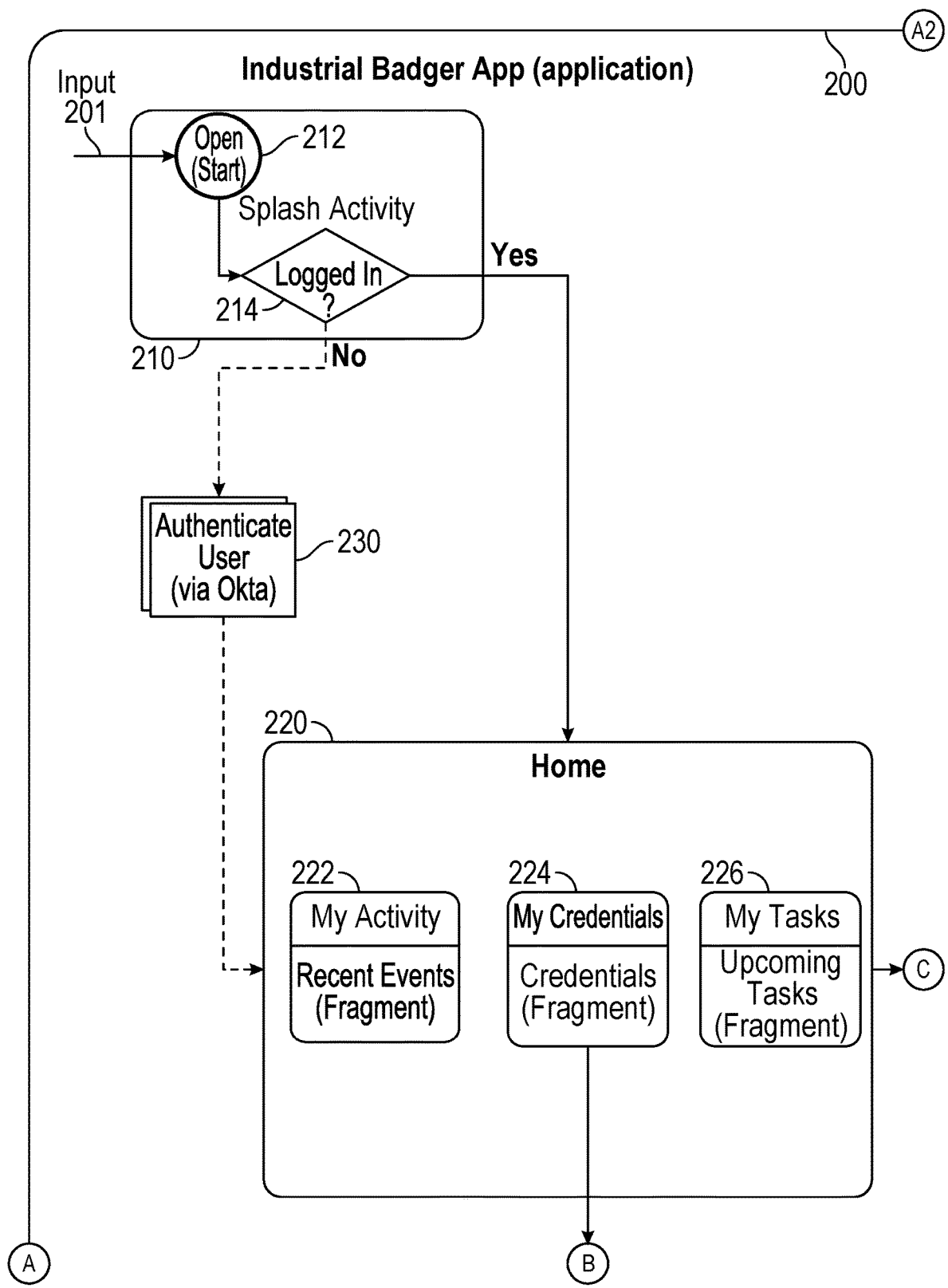
FIGS. 2A to 2D illustrate a method of extending capabilities of an existing application to augment learning of a device in training.
Figure 2B:
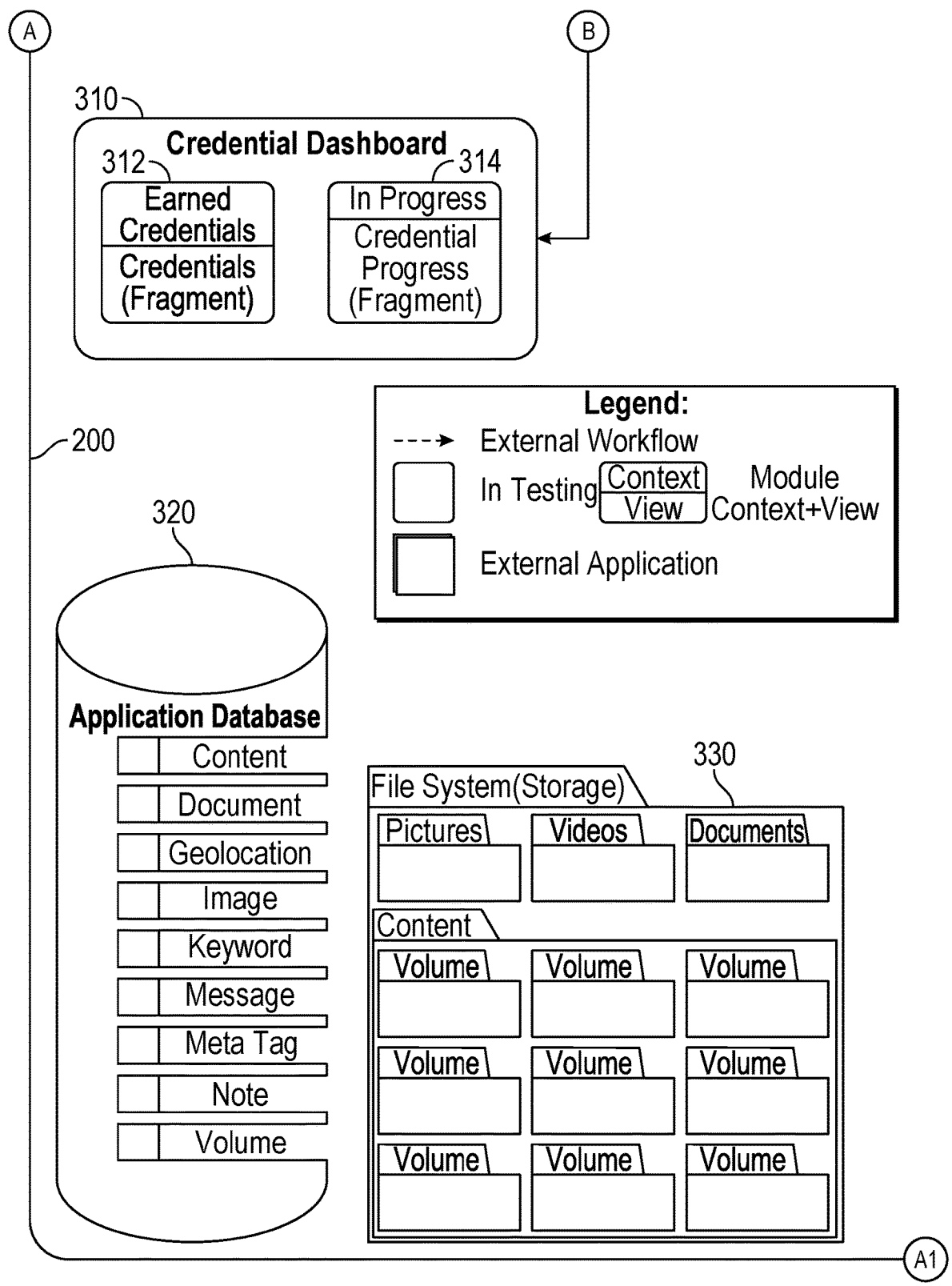
Figure 2C:
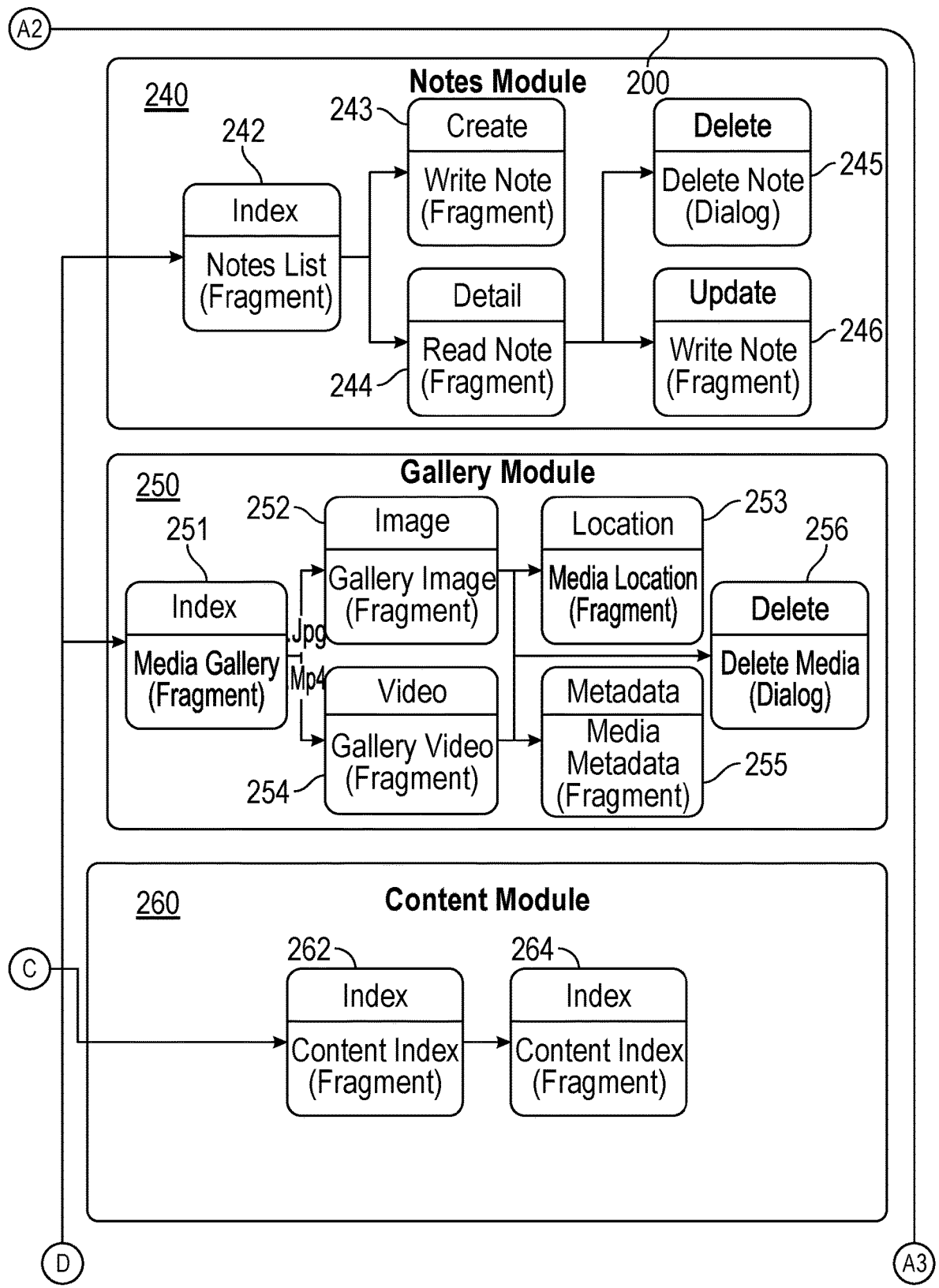
Figure 2D:
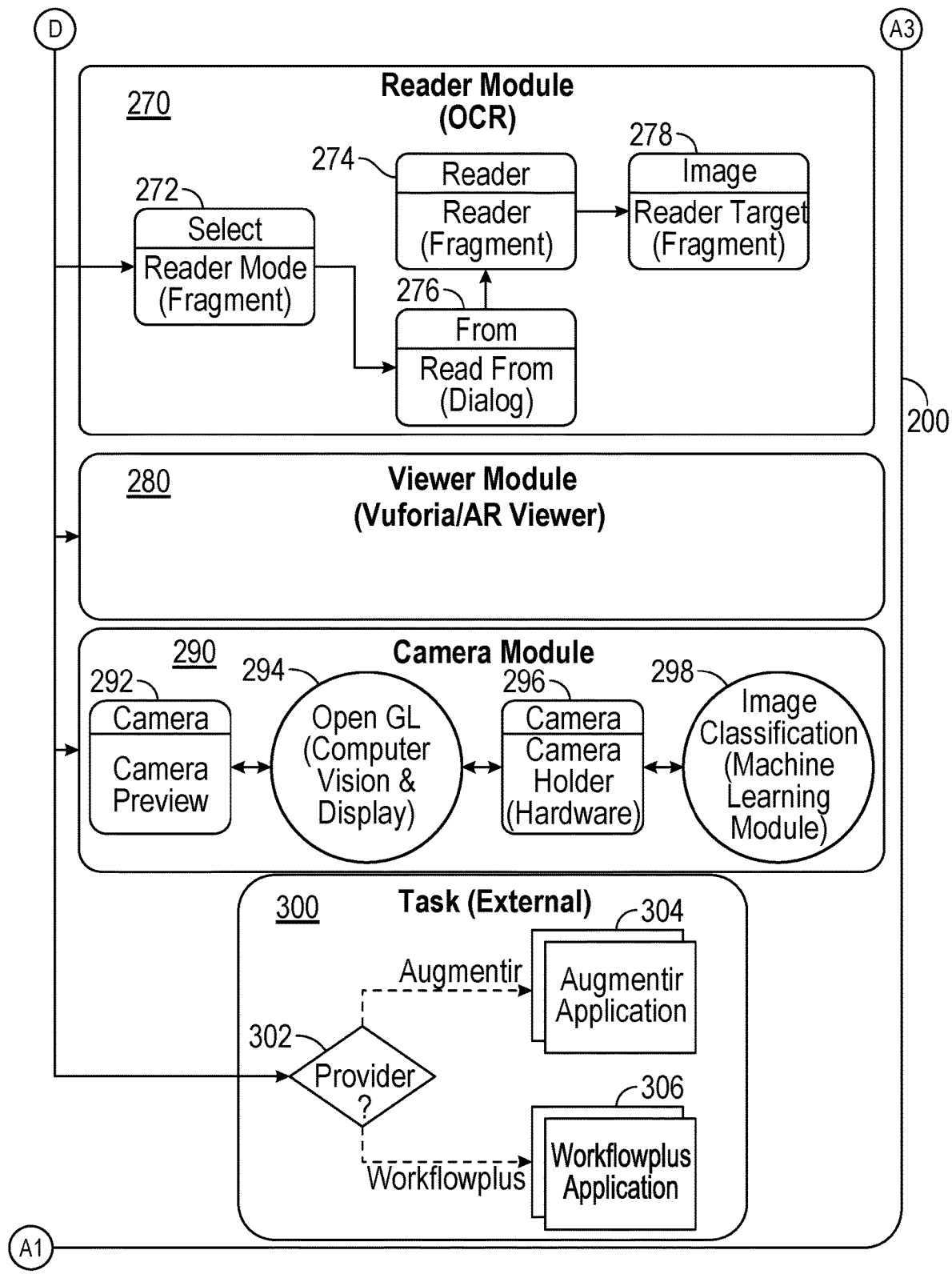

In some examples, the tool or user device 102 may be configured to display one or more user screens on the display 106. The one or more user screens (display 106) may include, but not limited to, one of a splash screen 210 in FIG. 2A (e.g., for displaying a logo, for example, a company logo, etc.), a home screen 220 in FIG. 2A (e.g., for providing main application navigation, a badger-bot, etc.), a content screen 260 in FIG. 2C (e.g., for querying and displaying content from the IMR, etc.), a notes screen 240 in FIG. 2C (e.g., for allowing users to view and save notes, to create and edit notes, attach images to notes, etc.), a gallery screen 250 in FIG. 2C (e.g., for viewing images that have been captured by the tool, etc.), a chat-bot screen (e.g., for interaction with the user, retrieving message history, etc.), and a combination thereof. In some examples, the tool or user device 102 may include a standard mobile application view. This view may be used for a traditional application user, which may struggle with newer, complex sets of interactions, or does not require an augmented-reality (AR) view.

In some examples, the tool or user device 102 may include a biometric authentication system with a blockchain verification system 460 (see FIG. 3) that may be configured to protect the user's information and provides tracking of user information. In an example, the tool or user device 102 may include a badger-bot 511 (see FIG. 4A). The badger-bot 511 may be configured to integrate a virtual agent/search engine with International Business Machines (IBM®) discovery services. The badger-bot 511 may be used to assist users with navigation of the tool or user device 102 and guide a user to offline content, such as documents, content, workflow services.

Figure 3:
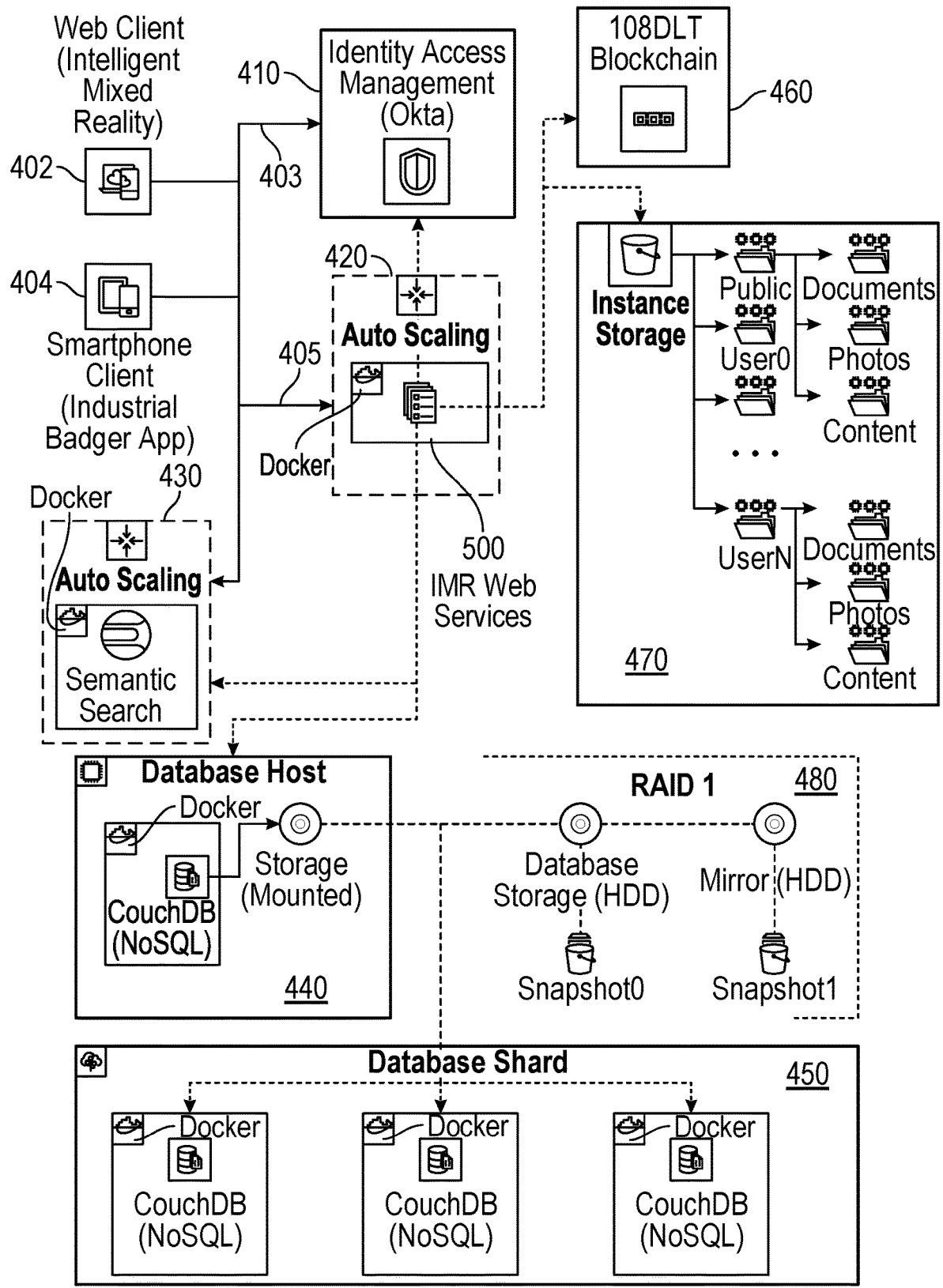
FIG. 3 illustrates a second local service application interacting with the first local service application to provide identity access management of the user device in FIG. 1.

In some examples, the tool or user device 102 may be integrated with the IMR-CMS in the web client 402 or smartphone client 404 in FIG. 3. The IMR-CMS allows for application content development system, synchronous integration for online and offline delivery to tool, mapping, document storage. Application data for content, multiple topics, maps, SSO integration, may be used to data mine information and deliver information to the user. In some examples, the tool or user device 102 may be integrated with a plurality of different external document repositories (database 531, 533 in FIG. 4B). This document services integration may allow the user to search and call information that may be localized and accessible once called. The user may have the ability to refine search results by document, image, and other types.

In some examples, the IBA® 200 may be managed by the Intelligent Mixed Reality System (IMR) Content Management System (CMS). IMR may be hosted on a remote server (e.g., a MICROSOFT® Azure server) to allow for a secure environment and integration with Active Directory and other Federated Services. The Content Management System (CMS) may provide a given user an editor for content that may be controlled by IBA® Content that may be called and localized for the user's request. In some examples, the Intelligent Mixed Reality System (IMR) may include a quiz engine that may be configured for testing users (such as training a user to learn a piece of equipment or a machinery). In some examples, the IMR may include a micro-service integration. The micro-service integration may permit an entity (e.g., an owner user or a user group) to add and remove access to embedded applications within the custom IBA®.

In some examples, the tool or user device 102 may include an augmented-reality (AR) viewer 280. In an example, the augmented-reality (AR) viewer may correspond to an autonomous viewer. The autonomous viewer may allow the tool or user device 102 to call a supported viewer. In some examples, the AR viewer 280 may be a Vuforia Studio®. The AR viewer 280 may be configured to integrate IMR content 2, video 254, Notes 242-246, Image Gallery, Image & Video Capture 251-254. AR applications may be swapped out of this view for integration for tools such as, ThingWorx®, ARCore®, Unity3D®, WikiTude®, ARKit®, etc. In some examples, the AR viewer 280 may be configured to align content when objects are recognized, information, such as video and text information is stored and localized and controlled by the user. The user may capture notes, images and record videos on demand.

In some examples, the tool or user device 102 may be integrated with accessibility options that may include, but not limited to, a hands free option for a device (e.g., the RealWear® HMT), optical character recognition (OCR) text and handwriting recognition, and markup language included for visually impaired users to navigate the tool or user device 102. Additional integration may include, but not limited to, object recognition included with the OCR viewer (e.g., OCR reader module 270), OCR document loader to read the text and user controlled views of the content viewer that allow for up to 300× magnification of content.

Figure 4A:
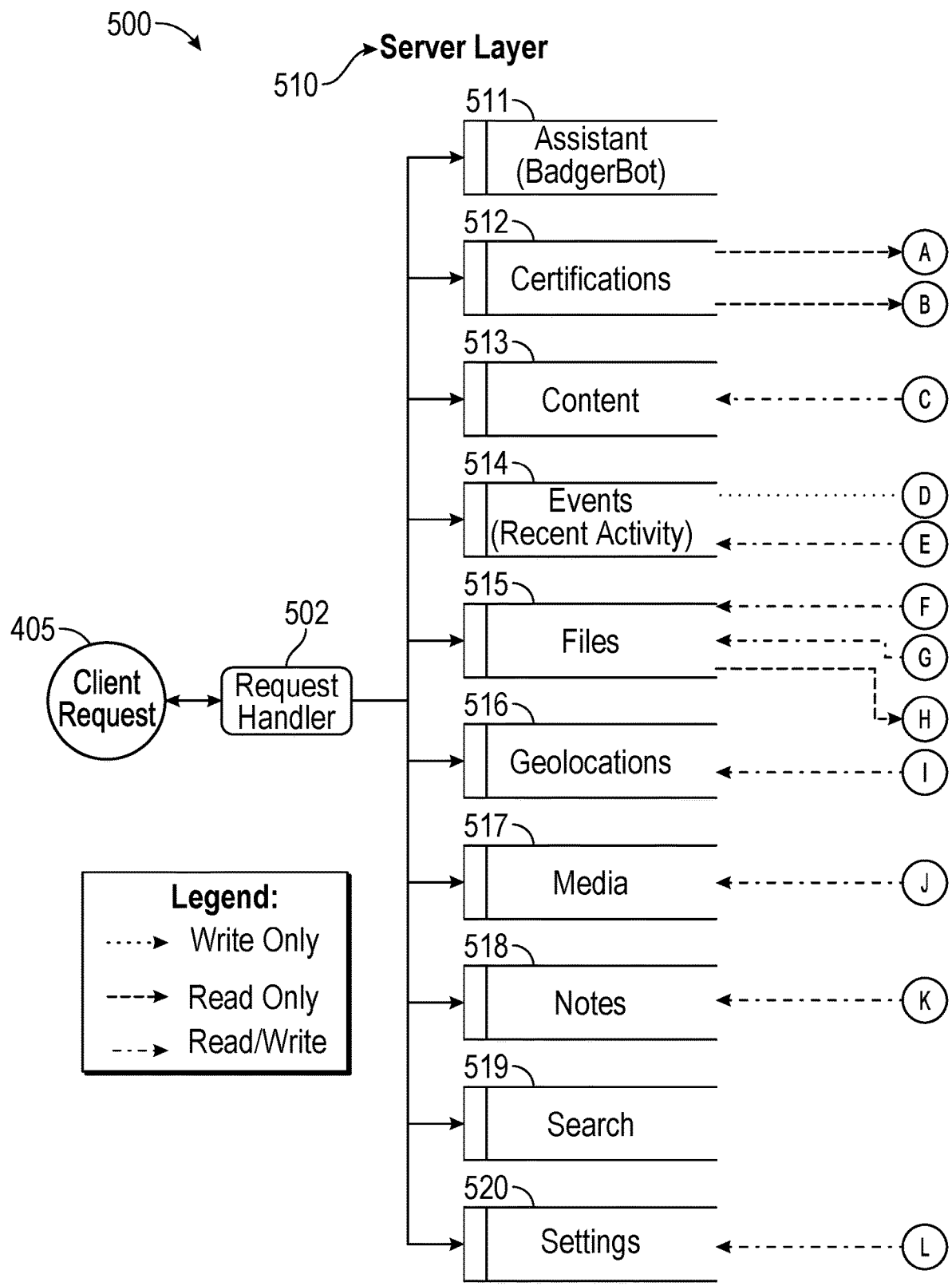
FIGS. 4A to 4D illustrate the second local service application interacting with the first local service application to access web services in the user device.
Figure 4B:
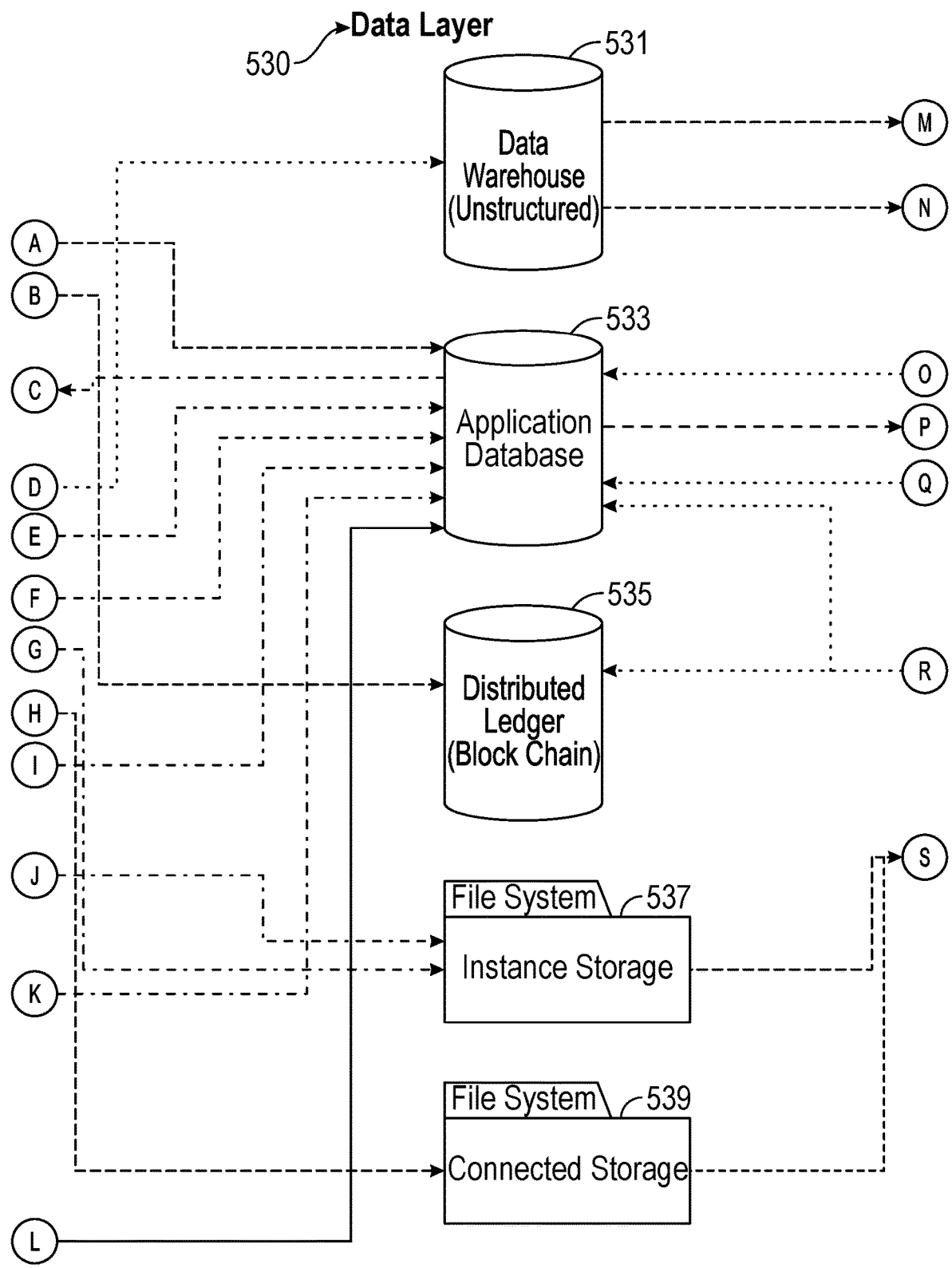
Figure 4C:
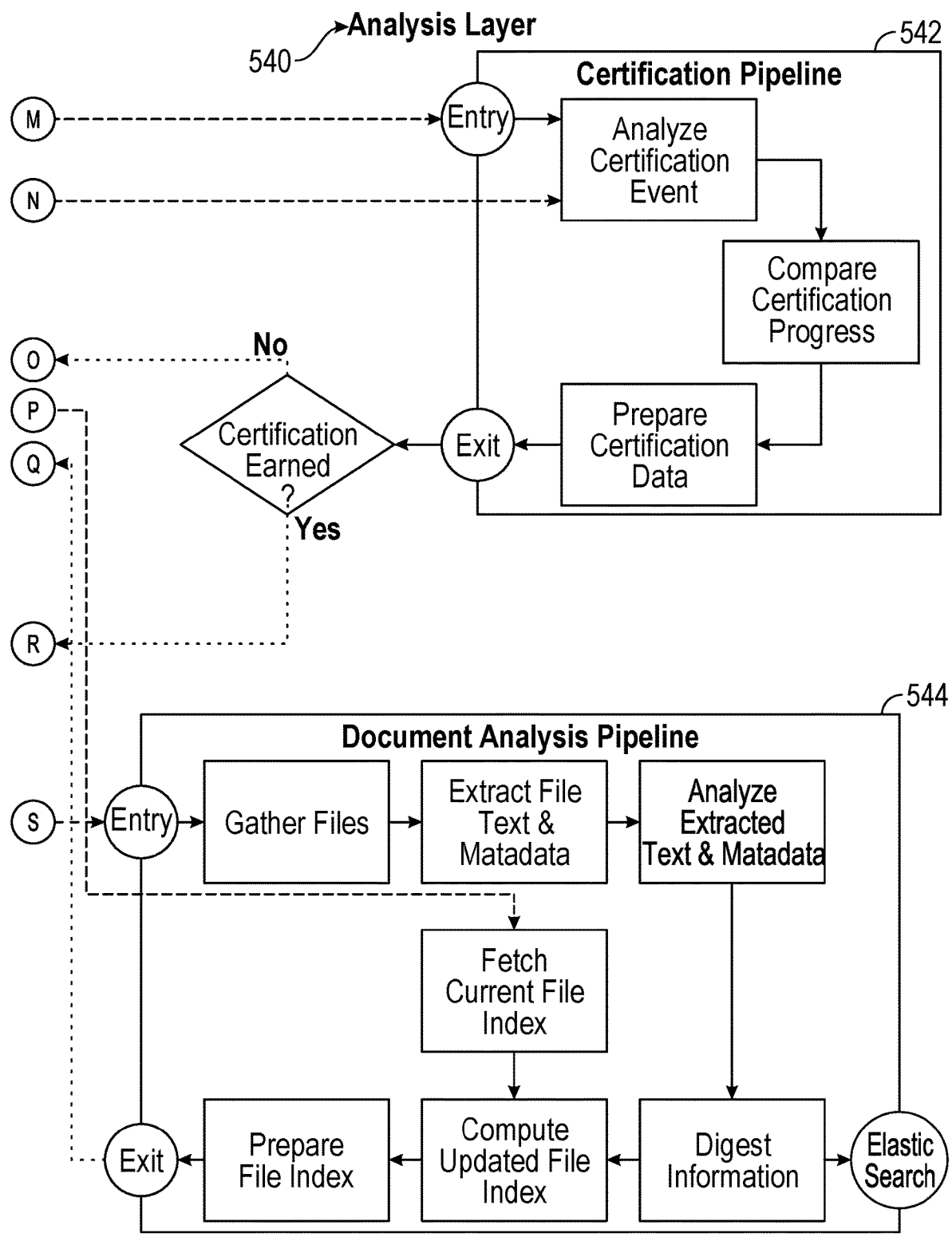
Figure 4D:
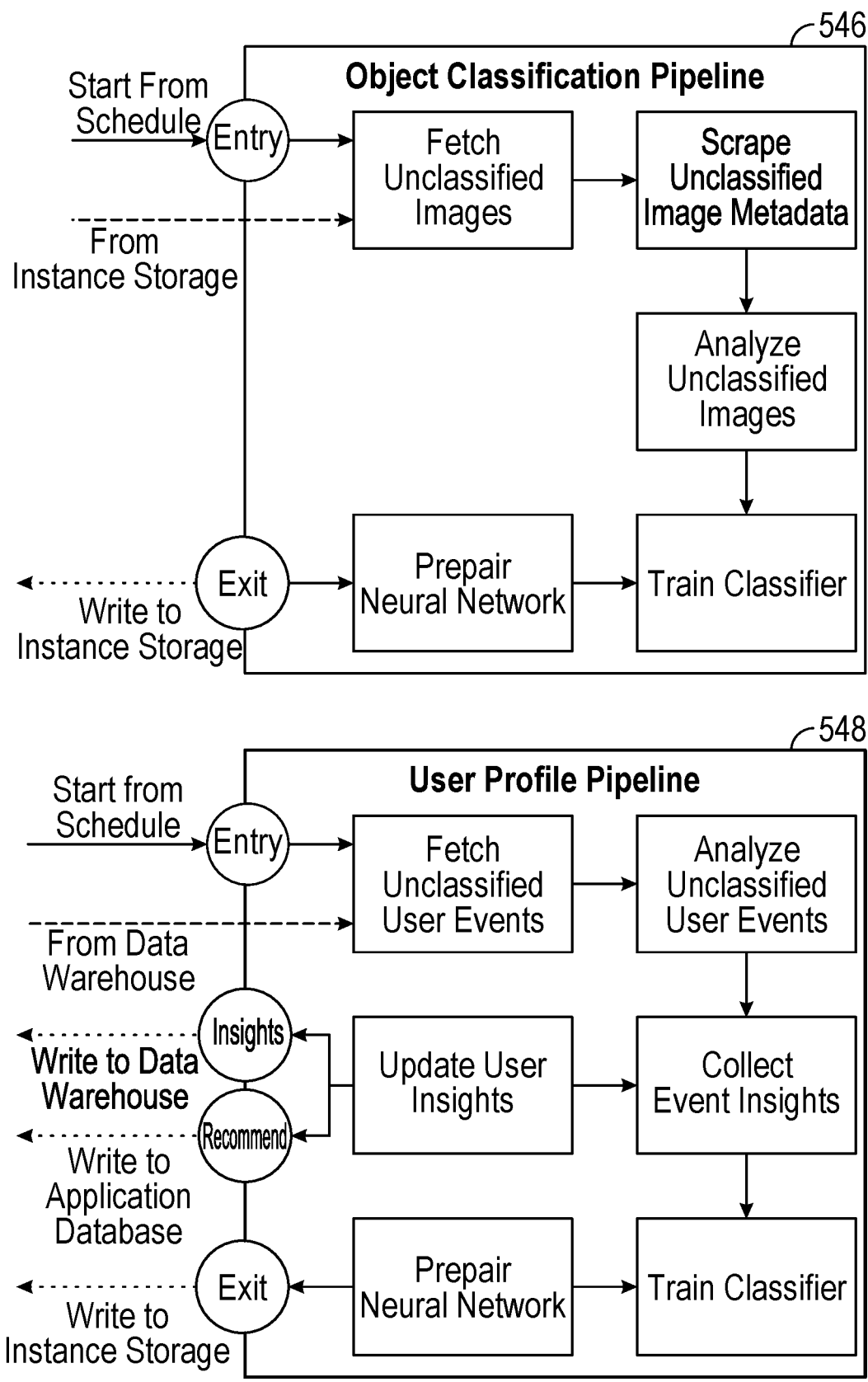

In some examples, the badger-bot 511 in FIG. 4A may be used to assist users with navigation of the tool or user device 102 and guide the user to offline content. The offline content may be localized and available offline to support users who may be working in extreme conditions. In an example, the offline content does not include instances where a connection is necessary, such as discovery search and AR interactions. Additionally, or alternatively, the tool or user device 102 may include Watson Discovery integration. In some examples, the tool or user device 102 may include PowerAI® integration and/or support services, custom services, data mining for measuring users, predictive analysis, and/or smart feeds. In an example, the tool or user device 102 may integrate with an Azure File server and Blob Storage®, Box®, and Drive®.

Additionally, or alternately, in some examples, the tool or user device 102 may be integrated with IBM Cognitive services for Chat and Virtual Agent® with integration into Watson Discovery Services®. In some examples, the tool or user device 102 may be integrated with Google Cloud Speech®. In an example, the tool or user device 102 may be configured with speech to text functionality. The tool or user device 102 may be configured with a note taking feature that may integrate with NLP and Image Gallery and provide for export functions. As such, user captured notes may be stored, for example, in the IMR, or may be pushed and shared with other users. In some examples, the tool or user device 102 may be configured with a search functionality. The search may include a localization offline search and external search with integration with Discovery and external document repositories. In some examples, the tool 102 may provide for image capturing, drawing, user-controlled AR interface, API integration, cognitive services, encryption services, object retrieval services, training delivery services, discovery services, markless tracking, user authentication, task tracking, geolocation, barcode scanning, OCR, remote mentor services, offline speech services, fisheye zoom functionality, export functionality, and quiz services.

FIGS. 2A to 2D illustrates a method of extending capabilities of an existing application 105 to augment learning of the device in training 107. In an example, the device in training 107 may be a piece of on-site machinery such as a computer numerical controlled (CNC) machine, a biomedical device, a robotic, an electronic equipment, or a controller used to train a user to learn to remotely control an offsite device such as an unmanned vehicle. The method of extending capabilities of the existing application 105 may include the steps of: creating on a user device 102, an authorized session for running a first local service application 200 on the user device 102 within an environment of an existing application 105 which runs on a system 104 remote from the user device 102, displaying on the user device 102, a home screen menu 220 which is personalized for a user, with selection options (222, 224, 226) to launch the first local service application 200 to execute within the existing application 105 to provide extended functionalities to the existing application to augment learning of the device in training 107, wherein the selection options enable the user device to perform one or more tasks on the another device 107, for example: resuming activities of a recent task previously performed (option 222), updating user's credentials through the training or learning (option 224), and starting a new task on the device in training or on another new device (option 226).

In operation, the user may open the first local service application 200 (hereinafter also may be referred to Industrial Badger App® (IBA)) to check to see if the user has been logged in 214. If the user has not been logged in, the user may be prompted to a login screen 210 to be authenticated 230 by an Identity Access Management (IAM) which may be provided by a third party application such as OKTA®, which integrates with any OAuth2 identity provider (such as GOOGLE®, Active Directory, AWS IAM, etc.)

Afterwards, the user may be presented with a home screen 220 detailing personalizable information about their usage within the first local service application 200. The user may also be presented with a non-obtrusive collapsing menu, allowing them to navigate to the subcomponents (such as option 222, 224, 226) within the first local service application 200:

a. The user may be presented with the following personalizable information:
  i. Option 222: user's recent activity within the first local service application 200, e.g.: last accessed content "HC10 w/wo DT: YRC1000 Controller"
  ii. Option 224: user's latest earned credentials/micro-credentials. The user may enter the Credential Dashboard 310 for a detailed view on their credentials/micro-credentials.
  iii. Option 226: user's next upcoming tasks. The user may be presented with the navigation destinations on respective screens, including: Notes 240, Gallery 250, Content 260, Reader OCR 270, Viewer (Augmented Reality Viewer) 280, Camera 280, Task 300.

In operation, the Notes module (see Notes screen 240) houses all components 242-246 related to reading, writing, and deleting notes, defined as a title, body, and optional collections of images, videos, and geolocations. Upon entering the Notes screen, the user may be presented with a list of notes they have taken while using the first local service application 200 (i.e., IBA). The user may open a note, perform a search through their notes, or create a note from this screen. The user may be presented with an empty template to create a note. The user may enter the title, body, and attach images/videos from device storage, or from a device camera. The user may additionally use the onboard device GPS to attach their current location to the note. The user may also view any of the attached images, videos, or geolocations (See Gallery module description) for actions the user may take while viewing an image. The user may be presented with a read-only note they have previously written. From this screen 240, the users may have the option to either update or delete the note. The user may also view any of the attached images, videos, or geolocations. The user may also be presented with an editable version of a note they have previously written. The user may modify the title, body, and update the collections of images, videos, and geolocations.

In operation, the Gallery module (see Gallery screen 250) houses all components 251-256 related to viewing and deleting any media captures while using the first local service application 200 (i.e., IBA® or the app). Upon entering the Gallery screen 250, the user may be presented with a list of images and videos they have captured. The user may select an image or video to view it. While viewing a media item (image or video) the user may view location data attached to the item, view/modify metadata (predefined & custom user tagging) attached to the item, or delete the item from the device completely. Viewing the item's location data may provide the user with a map. A location marker may be placed on the map based on the provided latitude and longitude from the location data. Viewing the item's metadata may provide the user with an editable list of tags attached to the image. The user may view/modify raw EXIF (Exchangeable Image File Format) data from the image (often set by the device camera), and view/modify custom tags from the image (as defined by the user).

In operation, the Content module (see Content screen 260) may be one of the main features of the first local service application 200 (i.e., IBA or the app), and houses all components 262, 264 related to viewing "content". Upon entering the Content screen 260, the user may be presented with a list of "content" collections (Volumes). A user may toggle a collection to see a list of pages (Content) that make up the Volume. The use may select the Volume to begin reading from the first page or select a page to begin reading that Volume from that page. The user may also search through content or re-sync their data with the server. The user may toggle the view between all content and training-only content. The user may be presented with a content viewer that changes behavior based on the type of that content (see Appendix, 1). The user may swipe left/right to view different pages of content. The user may increase/decrease a zoom factor (between 1× and 10× magnification) to make the content easier to read. The user may be provided with a non-obtrusive action menu. Using the actions prescribed by the menu, the user may increase/decrease zoom factor by one step, invert the color of the content, or enable/disable scrolling by device tracking. The user may additionally save the current Content page, or the complete Volume allowing them to view the object while offline (disconnected from a network).

In operation, the Reader module (see OCR Reader screen 270) houses all components 272-278 related to "reading" text. "Reading" text may be performed by using an Optical Character Recognition (OCR) engine, which extracts text from a provided image or file. The extracted text is then used by a Text-to-Speech (TTS) engine to vocalize the text to the user. Upon entering the Reader screen 270, the user may be presented with two options for OCR mode: (a) Read text using a simple (faster) text extraction model, (b) Read text using a more complex (slower, with more robust results) handwriting & text extraction model.

Upon selecting OCR mode, the user is presented with a dialog to choose the image or file they would like to be read aloud. Upon selecting the image or file the user may like to be read aloud, the OCR engine may begin to process and extract text from the subject. While the engine is running, the user may be presented with text letting them know that the task has been enqueued and is running. Upon completion, the user may be presented with a webpage generated from the extracted text. The TTS engine may also begin to read the text aloud to the user. The user may toggle back and forth between the extracted text and a view of the source file used by the engine. The user is provided with a non-obtrusive action menu. Using the actions prescribed by the menu, the user may increase/decrease zoom factor by one step, invert the color of the view, play/pause/stop the TTS engine from speaking, or increase/decrease engine speech rate.

In operation, the Camera module (see Camera screen 290) uses the several device hardware components to provide a camera implementation to the user. The camera may be used to both take pictures and capture video. The camera preview may be the primary view that the user may see. The user may be presented with the ability to capture an image/video, zoom in/out in the preview, and freeze the preview. The user may also be presented with a non-obtrusive action menu. The user may use the menu to augment the camera using a renderer. When the renderer is enabled, the preview may be: (a) transformed using computer vision effects to help facilitate readability of the screen, (b) augmented to render a 3D model for reference, (c) fed to an image classifier to help the user locate items in their 3D space.

In operation, the Tasks module (see Task screen 300) facilitates entry into a workflow provider application. The workflow provider may detail a list of tasks and/or workflows for the user to complete. Its integration into the first local service application 200 (or the IBA®) may allow the user to seamlessly flip back and forth between workflow and the first local service application 200 (or the IBA®), so the user may use information from the first local service application 200 (or the IBA®) to walk through/complete tasks from the workflow provider.

In another operation, the Viewer module (see Viewer Screen 280) may tie together all the previously defined modules (Notes, Gallery, Content, Camera, Tasks) into a single location, and may use an Augmented Reality Viewer (Viewer) to provide cognitive vision-based services. In addition to all of the features described in the separate modules, the Viewer module may compliment and extend the functionality of the existing application 105 in the remote system 104, by providing: (a) Image Target Recognition; a service in which the camera feed used by the Augmented Reality engine on the user device 102 may be fed to an image classification model to recognize and locate potential objects. The user may be alerted when the engine has recognized any potential objects; (b) Model Target Recognition; a service in which the user may specify an object that they are looking for. The user may select a view from a list of views of the object (from the object as a whole to a smaller component of the object). The view may then be displayed on the screen 270, and the user will be alerted when the engine has recognized and located the chosen view, helping the user find and locate an object through Augmented Reality; (c) an "Augmented Search"; a service in which the Viewer module uses image and object recognition to locate defined subjects within the user's/camera's field of view, and curate notes, images, content, documents, and tasks related to the subject. This service provides a "Just-In-Time" intelligent search for the user, without the user having to type anything into a search bar; (d) Model Rendering; a service in which a 3D model can be rendered and displayed to the user. The user may interact with the 3D model by rotating and zooming in/out. If supported by the 3D model, the user may view "Augmented Reality Experiences", or animations that manipulate the model in a 3D space.

In operation, the Credential Dashboard (see Credential screen 310) details a space where the user may view any obtained credentials/micro-credentials (credentials). Credentials may be obtained through the completion of training courses, which may be found in the Content module. Credentials may be written using an OpenBadge® specification, allowing the user to easily carry and display their credentials though any OpenBadge® platform (Backpack).

Upon entering the Credential Dashboard, a list of all credentials the user has earned (i.e., earned credentials 312) is presented to the user. The user may select a credential to view specific information about it (i.e. name, what the credential was given for, when it was issued, when it expires, etc.). The user may additionally toggle to a second tab, detailing what credentials they have made progress towards earning. When selected, a list of all in-progress credentials are presented to the user. The user may select an in-progress credential 314 to view specific information about it (i.e. name, completed requirements, remaining steps to complete and earn the credential, etc.)

Though not directly listed in the diagram, BadgerBot® is a personal virtual assistant that facilitates user usage of IBA®. BadgerBot® is accessed from a menu option from every screen of the app. Backed by Artificial Intelligence (AI), BadgerBot® semantically works to understand what it really is that the user is asking for. BadgerBot® may be used to: (a) navigate to any area of IBA®, (b) control the application; given any view within the app, BadgerBot® is contextually aware of interactable elements on the screen, and can appropriately interact with them though user input, (c) perform sematic searching though natural language processing; given a user inquiry, BadgerBot® uses natural language processing to semantically understand what the user is asking for, and may return appropriate information.

FIG. 3 illustrates a second local service application 500 which is a separate local service application which interacts with the first local service application 200 to provide identity access management of the user device 102 (see FIG. 1). The user device 102 in FIG. 1 may be implemented as either a web client 402 running an Intelligent Mixed Reality (IMR®) application or a smartphone client 404 running an Industrial Badger Application (IBA®).

FIG. 3 also illustrates a method of identity access management for web services 500 (i.e., running second service application 500 in FIG. 1). The method includes the steps of: creating on a user device 402 or 404, a session's access token and an identity token to be sent along with a request 405 for web services, wherein: the accessing of web services includes at least one of: retrieving and pushing information from an instance storage 470 which is client specific and protected from unauthorized access by another instance storage, the session's access token may indicate a location where the session's access token was created, an expiration time, and a hash identity for verifying a validity of the session's access token; and the identity token may identify a user who sends the request; and the step of authenticating the user on the user device 402, 404 according to the session's access token and the identity token to authorize the accessing of web services 500 (i.e., IMR web services) in a session.

More specifically, the web client 402 or smartphone client 404 may use an Identity Access Management 410 program may be a third-party application such as OKTA® to check if an existing authorized session exists, if not exists or if the session has expired, the user may be required to log in to create an authorized session. It should be noted that every request sent by the client 402, 404 to the web services 500 includes the session access token which includes information when the access token was created and its expiration time. Also, an identity token describing an identity of the user sending the request needs to be present an entire time of the session.

Details of the operations of identity management of web services 500 in FIG. 3 may be further describe by FIGS. 4A to 4D, which The web services 500 (i.e., second local service application) may interact with the first local service application 200 to carry out the web services 500. In an implementation, the web services 500 are built to be platform agnostic, having the features of allowing: 1) Ease of deployment into a company's existing cloud infrastructure (Google Cloud Platform®, Amazon Web Services®, Microsoft Azure®, etc.); 2) Simplification of deployment into a company's private managed servers; 3) Simplification of instance load-balancing to handle a varying influx of traffic; 4) Company specific instance configuration; 5) Simplification of distributed platform updates; 6) Secure access to private company files; 7) Company ownership of data.

Throughout the description, the term "instance" may be used to describe the web services 500 (also known as IMR Web Services). An "instance may be defined as a closed system that may be deployed to a company's existing cloud infrastructure, privately managed servers, or through a proprietary managed cloud platform. User requests 405 may be generated via the Web client 404 or the smartphone client 404 and are resolved through a company's web services instance. Any major differences in service usage between the Web client 404 or the smartphone client 404 may be identified when necessary.

Referring to FIG. 3, the Identity Access Management 410 may be a 3rd-party Identity Access Management (IdAM) provider such as OKTA® which is used to authenticate, authorize, and identify users of the Industrial Badger App and IMR Web Services. OKTA® allows for integration with other IdAM providers (e.g. AWS® Cognito®, Microsoft Active Directory®, Google®, Facebook®, etc.), allowing companies to leverage their own IdAM standards without having to create and manage separate user accounts.

For Data Access and Security, throughout the design of the web services 500, no data may be publicly shared from instance to instance. Given two companies, Company A and Company B, with their respective service instances, Instance A and Instance B, Company A has no access or knowledge of Instance B, and vice-versa. Additionally, by leveraging existing IdAM standards, a company may additionally limit who internally has access to what data on their instance. This lack of instance overlap minimizes the chances of a data breach, and significantly limits the amount of data that may be obtained in a breach if one occurs. In an example, the web services may include: enabling the user to retrieve or push information from the instance storage utilizing a blockchain into a distributed and immutable format.

FIGS. 4A to 4D illustrate the web services 500 as the second local service application interacting with the first local service application 200 to access web services in the user device 102. In an example, the request to access web services 500 may include: carrying out tasks and routing traffics through a service layer 510, retrieving and pushing information from the instance storage 537 through a data layer 530; and analyzing performance of the user and evaluating ease of deployment of a service application in the user device within an existing application in a system remote from the user device (web client 402 or smartphone client 404) through an analysis layer 540.

The Service Layer 510 describes what the user directly interacts with when making requests to the web services 500 (IMR Web Services). It may be assumed that the user may be authenticated through OKTA®, otherwise, the request 405 will not continue past a request handler 502. The Service Layer 510 may include performing at least the services of: training a chatbot to learn unique jargon to interact with the user to assist in document search from the instance storage;

(a) Assistant 511: The Assistant (BadgerBot) service routes traffic to a personal assistant (chatbot) that the user may converse with. In addition to the standard application controls, the Assistant 511 uses insights gathered in the Document Analysis Pipeline and User Profile Pipeline in conjunction with natural language processing to answer questions, and search through documents for related passages (using the Search service). By using instance unique data and insights, the chatbot can be reliably trained on unique jargon, allowing it to converse at the user's level. This also implies that no two Assistant instances are the same, creating a unique experience from instance to instance.

(b) Certifications 512: the Certification service routes traffic between the Distributed Ledger 535 and Application Database 533. From this service, users may track any current progress towards earning a Certification/Credential/Micro-Credential (maintained within the Application Database), or view and/or manage their earned Certification(s)/Credential(s)/Micro-Credential(s) (maintained within the Distributed Ledger 513). Earned Certifications/Credentials/Micro-Credentials may be exported from the platform for use/display in other environments.

Certifications/Credentials/Micro-Credentials are exported as images, using the OpenBadge specification. Under this specification, credential data is encrypted and "baked" (attached as metadata) into the image. This data is used to: (i)

Verify the Certification/Credential/Micro-Credential in the Distributed Ledger 535, (ii) Verify the recipient of the Certification/Credential/Micro-Credential, (iii) Verify the validity of the Certification/Credential/Micro-Credential.

Web: Via web client, an administrator may create and/or manage the Certifications/Credentials/Micro-Credentials instance users may earn. As Certification/Credential/Micro-Credential earning-criteria evolves, updates are maintained using a version history as to not inadvertently invalidate the validity of earned Certifications/Credentials/Micro-Credentials.

(c) Content 513: The Content service routes traffic to the file index stored within the Application Database 533. The index acts as a "light-weight" pointer to the location of physical files that the user may view using the Files service.

Web: Via web client, users may generate content in the following ways: (i) Writing "content" using a Rich Text editor to generate displayable HTML pages; (ii) Uploading and extracting text from a PDF or similar textual document (uploaded to Instance Storage); (iii) Extracting text from a PDF or similar textual document (obtained from Connected Storage); (iv) Uploading an image or video (uploaded to Instance Storage); (v) Linking to an image or video (obtained from Connected Storage)

(d) Events 514: The Events 514 service logs user generated data to both the Data Warehouse and the Application Database. Event-driven data written to the Data Warehouse is used to profile a user to gain specific and unique insights and recommendations through the User Profile Pipeline. Data written to the Application Database is activity-driven, giving users an overview and entry point to anything they were recently working on (i.e. recently created/edited notes, recently viewed images, recently viewed content, recently viewed training courses, etc.).

In the interest of privacy, Event 514 collection may be an optional feature and may be enabled or disabled by the user; it is however meant to enrich and deepen the user's experience to its fullest extent on the platform.

(e) Files 515: The Files service's primary role is to route user traffic to a requested file. The request is matched to the file index stored in the Application Database (533). The matched index may then be used to route the request to the location of the requested file in either the Instance Storage 537 or Connected Storage 539.

The Files 515 service also allows the user to upload and/or manage files from either Web or Mobile client to the Instance Storage 537. Changes made to the Instance Storage 537 in this way will trigger an event that will launch a task beginning document analysis and digestion in the Document Analysis Pipeline 544 of any newly added/updated files.

(f) 516 Geolocations: The Geolocations 516 service logs and aggregates spatial data collected while using the mobile client. Data is obtained through one of the following ways: (i) Saved directly by the user; (ii) Extracted from media metatags; (iii) Attaching a geolocation to a Note, (iv) Attaching a geolocation to an image; (v) Attaching a geolocation to a video; (vi) Spatial data collection is an optional service, and it is a feature that may be enabled or disabled while using the mobile client. While enabled, this data is used to prefilter Notes 518, Media 517, Content 513, and Files 515 within a configurable distance from the user's current location.

(g) Media 517: The Media 517 service managed images and videos captured while using the smartphone client 402. This service has similar functionality to the Files 515 service; however, it may be used specifically for image and video files. Images and videos uploaded by the service additionally have any spatial data extracted and saved to the Application Database 533 and are placed in a queue of unclassified images to be analyzed through the Object Classification Pipeline 546.

(h) Notes 518: The Notes 518 service manages notes the user may take while using the Mobile client. A note 518 is required to have a text body and may optionally have a title. Users may also attach images, videos, and geolocations to the note, which may be referenced within the note 518.

(i) Search 519: The Search 519 service routes traffic to the instance's hosted Elasticsearch instance. Media 517 (images and videos), Geolocations 516 are added directly to Elasticsearch through their respective services, and Content 413 and Files 515 are analyzed and digested through the Document Analysis Pipeline 544.

Like most search engines, the Search service may perform keyword searches through indexed data, but the instance additionally utilizes a natural language processing pipeline, allowing the users to perform a semantic search by directly analyzing and understanding a given query. Query responses may provide highlighted passages related to the user's query and/or a pointer to take the user directly to a requested Note 518, image, video, Content, or File.

(j) Settings 520: The Settings 520 service manages any user specific configurable options in either web or mobile client. The usage of the Settings 420 service is meant to create a consistent experience across multiple devices and is an optional feature.

II. Data Layer 530: The Data Layer 530 serves as a backing to any incoming authorized user requests. Users will receive data primarily from the Application Database 533, Distributed Ledger 535, Instance Storage 537, and Connected Storage 539.

Data Warehouse 531: The Data Warehouse 531 describes an unstructured data store. Data stored within the Data Warehouse is obtained though usage of the mobile client and is aggregated at the user level. This data is used to profile the user in the User Profile Pipeline, finding user insights, providing specific recommendations to the user, and understanding platform usage across the instance.

Application Database 533: The Application Database 533 houses all user accessible data.

Distributed Ledger 535: The Distributed Ledger 535 (Blockchain) is a distributed, immutable data store. Because of the distributed nature of the Blockchain, it is the only platform that exists outside of the hosted instance. The Blockchain is used to manage user obtained Certifications/Credentials/Micro-Credentials.

Instance Storage 537: The Instance Storage 537 describes a Read/Write file store for the instance. The Instance Storage 537 contains public, instance-wide file storage, as well as file storage for each user on the platform.

When publicly stored files are added, updated, or removed, they will trigger an event that begins document analysis and digestion in the Document Analysis Pipeline 544.

Connected Storage 539: Connected Storage 539 describes any number of 3rd-party file storage providers (e.g. Google Drive, AWS S3, Azure File Storage, DropBox, Box, etc.). A company may configure a storage provider by providing access credentials to the storage (often an Access Token or Public Key). Connected storage is not directly modified by the IMR Web Services but will respond to external changes and updates. Learning Management Systems (e.g. Canvas, Blackboard, Moodle, etc.) may also be configured as a storage provider. Files and data from Learning Management Systems may be used directly to create training courses. A company may offer a Certification/Credential/Micro-Credential upon completion of training courses. Triggering events (external changes and updates) will kick off a task in the Document Analysis Pipeline 544.

III. Analysis Layer 540: The Analysis Layer 540 describes several data pipelines used to enhance the company and user's experience while using the web and mobile clients.

Certification Pipeline 542: The Certification Pipeline 542 is used to automate the provisioning of Certifications/Credentials/Micro-Credentials. When created, Certifications/Credentials/Micro-Credentials contain details describing how it may be earned by a user. When the IMR Web Services receive a Certification Event or Certification-related event, the event, Certification/Credential/Micro-Credential criteria, and user progress are queried and analyzed. The user's progress may be updated in the Application Database 533 so the user may view their progress, and/or the Certification/Credential/Micro-Credential is issued to the user, writing the transaction to the Distributed Ledger 535.

Document Analysis Pipeline 544: The Document Analysis Pipeline 544 is used to analyze new and updated documents introduced to the ecosystem through Instance Storage 537 and/or Connected Storage 539. The pipeline gathers new and updated files, extracts the text directly if the file is a textual document, extracts text using optical character recognition if the file is a PDF or image-based document, and extracts metadata from non-textual files. The extracted text is then analyzed through natural language processing and is digested by Elasticsearch. The pipeline then retrieves the existing file index and computes the index with the new information. The index is then updated in the Application Database 533.

Object Classification Pipeline 546: The Object Classification Pipeline 546 is used to create instance customized machine learning models for the Viewer Module in the mobile client. Files uploaded through the Media service are aggregated and sent to the pipeline at a configurable schedule. Metadata is either extracted from the images and videos directly or generated through classification using existing models. Files that contain descriptive metadata are then used to re-train the existing machine learning models, increasing the model's accuracy. The new models are then compressed and prepared for download onto user devices running the mobile client.

User Profile Pipeline 548: The User Profile Pipeline 548 may be used to analyze user event data. Events 514 written to the Data Warehouse 531 through the Events 514 service are aggregated at the user level and are mined to generate platform usage data. The user's platform usage data is used to create insights and recommendations unique to the user, which are appropriately written to the Application Database 533. The user level data is then rolled up to a company level, and used to retrain the machine learning model, increasing the performance and accuracy for new event data. The new model is then compressed and prepared for download onto user devices running the mobile client, allowing for on-the-go insights and recommendations to the user.

Figure 5:
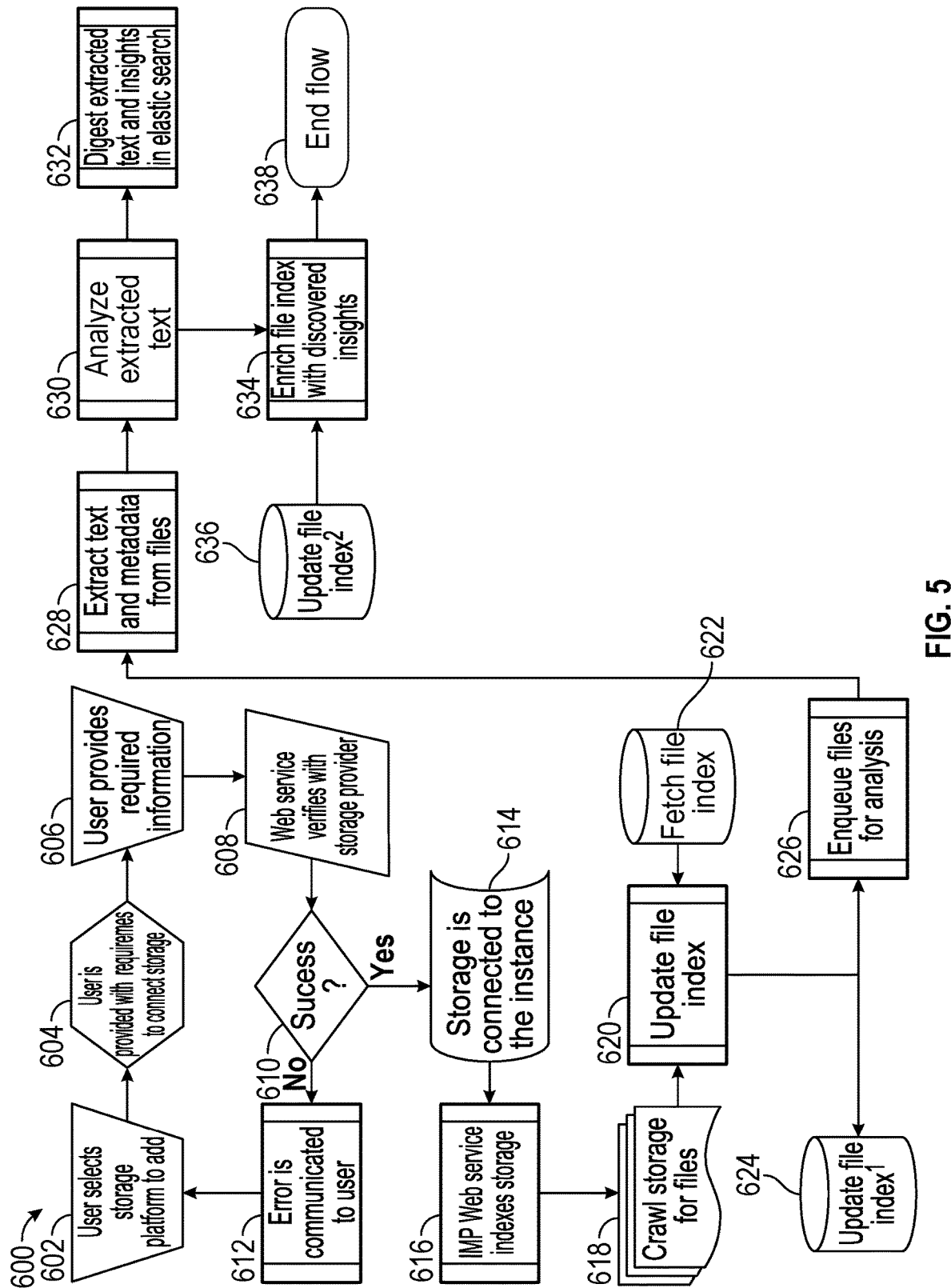
FIG. 5 illustrates a connected storage work flow in the web services access by an intelligent mixed reality (IMR) client or a user device.

FIG. 5 illustrates a connected storage work flow in the web services access by an intelligent mixed reality (IMR) client or a user device. The flowchart 600 illustrates details of the Connected Storage workflow drills down into a complex feature of the web service's Content Service 513. By connecting an external storage provider (such as Google Drive, Microsoft Azure Storage, or Box), the files contained within the external storage provider may be located and indexed 262, 264 for use on both the smartphone client 404 and the web client 402 (accessed through web service's Files Service 515), in order to automatically generate Content through the web service's Content Service 513, so users may not be required to re-write and manage multiple versions of a single file for the Content Service 513.

What have been described above are examples. It is, of course, not possible to describe every conceivable combination of components or methodologies for purposes of describing the examples of the disclosure described herein, but one of ordinary skill in the art will recognize that many further combinations and permutations of the examples are possible. Accordingly, the examples described herein are intended to embrace all such alterations, modifications and variations that fall within the scope of the appended claims and the application. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A method of identity access management for web services, comprising:
  creating on a user device, a session's access token and an identity token to be sent along with a request for accessing web services, wherein:
    the accessing of web services comprising at least one of: retrieving and pushing information from an instance storage which is client specific and protected from unauthorized access by another instance storage;
    the session's access token indicates a location where the session's access token was created, an expiration time, and a hash identity for verifying a validity of the session's access token;
    the identity token identifies a user who sends the request; and
  authenticating the user on the user device according to the session's access token and the identity token to authorize the accessing of web services in a session.

2. The method of claim 1, wherein the accessing of web services comprising:
  enabling the user to retrieve or push the information from the instance storage utilizing a blockchain into a distributed and immutable format.

3. The method of claim 1, wherein the authenticating comprising validating, authenticating and/or revoking multi-factor credentials and the multi-factor credentials comprises one or more inputs of: password, fingerprint, facial biometrics, voice, geolocation and tokens.

4. The method of claim 2, wherein the request to access web services further comprising:
  carrying out tasks and routing traffics through a service layer;
  retrieving and pushing information from the instance storage through a data layer; and
  analyzing performance of the user and evaluating ease of deployment of a service application in the user device within an existing application in a system remote from the user device through an analysis layer.

5. The method of claim 4, wherein the traffic routing in the service layer comprising performing at least two of:
  training a chatbot to learn unique jargon to interact with the user to assist in document search from the instance storage;

tracking certification service routes between distributed ledger and application database for validity of user's credentials certification;
providing a pointer location to route a content service to a file indexed application database;
routing the user to access a most recent event-driven data and activity-driven data generated by the user as a file entry point according to a service log;
attaching geolocations data to information being pushed or retrieved from the instance storage;
capturing and analyzing image and vides files through an object classification pipeline of a media service;
managing notes taken on the user device and attaching images, videos and geolocations to the notes;
routing traffics through respective hosted elasticsearch instance services;
managing user' specific configurations for consistent experience across multiple devices through a settings service.

6. The method of claim 4, wherein the data layer further comprising:
a data warehouse to aggregate user level data from the user device into a data warehouse;
an application database to store user accessible data;
a distributed ledger to distribute the retrieved or pushed information through the blockchain that is external to the instance storage;
the instance storage to update and store the information into one or both of public files and user's files; and
a connected storage to access files from one or more third-party file storage providers.

7. The method of claim 4, wherein the analysis layer comprises:
a certification pipeline to automate provisioning of certification and credentials of the user in a progress pipeline for the analysis of the user's performance and the evaluation of ease of deployment of the service application in the user device within the existing application in the system;
a document analysis pipeline to analyze new and update documents introduced to the ecosystem through the instance storage and/or connected storage,
an object classification pipeline to create instance customized machine learning models to train viewers; and
a user profile pipeline to analyze user event data written to a data warehouse through events service.

8. A non-transitory computer-readable medium storing program codes, when executed by a processor of a user device, configures the user device to perform operations of identity access management for web services, the operations comprising:
creating on a user device, a session's access token and an identity token to be sent along with a request for accessing web services, wherein:
the accessing of web services comprising at least one of: retrieving and pushing information from an instance storage which is client specific and protected from unauthorized access by another instance storage;
the session's access token indicates a location where the session's access token was created, an expiration time, and a hash identity for verifying a validity of the session's access token;
the identity token identifies a user who sends the request; and
authenticating the user on the user device according to the session's access token and the identity token to authorize the accessing of web services in a session.

9. The non-transitory computer-readable medium of claim 8, wherein the accessing of web services comprising:
enabling the user to retrieve or push the information from the instance storage utilizing a blockchain into a distributed and immutable format.

10. The non-transitory computer-readable medium of claim 8, wherein the authenticating comprising validating, authenticating and/or revoking multi-factor credentials and the multi-factor credentials comprises one or more inputs of: password, fingerprint, facial biometrics, voice, geolocation and tokens.

11. The non-transitory computer-readable medium of claim 9, wherein the request to access web services further comprising:
carrying out tasks and routing traffics through a service layer;
retrieving and pushing information from the instance storage through a data layer; and
analyzing performance of the user and evaluating ease of deployment of a service application in the user device within an existing application in a system remote from the user device through an analysis layer.

12. The non-transitory computer-readable medium of claim 11, wherein the traffic routing in the service layer comprising performing at least two of:
training a chatbot to learn unique jargon to interact with the user to assist in document search from the instance storage;
tracking certification service routes between distributed ledger and application database for validity of user's credentials certification;
providing a pointer location to route a content service to a file indexed application database;
routing the user to access a most recent event-driven data and activity-driven data generated by the user as a file entry point according to a service log;
attaching geolocations data to information being pushed or retrieved from the instance storage;
capturing and analyzing image and vides files through an object classification pipeline of a media service;
managing notes taken on the user device and attaching images, videos and geolocations to the notes;
routing traffics through respective hosted elasticsearch instance services;
managing user' specific configurations for consistent experience across multiple devices through a settings service.

13. The non-transitory computer-readable medium of claim 11, wherein the data layer further comprising:
a data warehouse to aggregate user level data from the user device into a data warehouse;
an application database to store user accessible data;
a distributed ledger to distribute the retrieved or pushed information through the blockchain that is external to the instance storage;
the instance storage to update and store the information into one or both of public files and user's files; and
a connected storage to access files from one or more third-party file storage providers.

14. The non-transitory computer-readable medium of claim 11, wherein the analysis layer comprises:
a certification pipeline to automate provisioning of certification and credentials of the user in a progress pipeline for the analysis of the user's performance and the evaluation of ease of deployment of the service application in the user device within the existing application in the system;

a document analysis pipeline to analyze new and update documents introduced to the ecosystem through the instance storage and/or connected storage, an object classification pipeline to create instance customized machine learning models to train viewers; and a user profile pipeline to analyze user event data written to a data warehouse through events service.

* * * * *